United States Patent
Lane et al.

(10) Patent No.: US 8,473,569 B2
(45) Date of Patent: Jun. 25, 2013

(54) APPARATUS AND METHOD FOR CONSUMER-ORIENTED DISTRIBUTION OF INFORMATION PROCESSING CAPABILITY

(75) Inventors: Bradley K. Lane, Raleigh, NC (US); Lisa A. Ferrera, Pearland, TX (US); Pascal Dorster, Houston, TX (US); Timothy A. Adcock, Richardson, TX (US); Gene A. Frantz, Sugar Land, TX (US)

(73) Assignee: Texas Instruments Incorporated, Dallas, TX (US)

( * ) Notice: Subject to any disclaimer, the term of this patent is extended or adjusted under 35 U.S.C. 154(b) by 2912 days.

(21) Appl. No.: 11/060,946

(22) Filed: Feb. 18, 2005

(65) Prior Publication Data

US 2006/0190556 A1 Aug. 24, 2006

(51) Int. Cl.
*G06F 15/16* (2006.01)
(52) U.S. Cl.
USPC ............ 709/217; 709/203; 709/219; 709/229
(58) Field of Classification Search
USPC .................................. 709/203, 217, 219, 229
See application file for complete search history.

(56) References Cited

U.S. PATENT DOCUMENTS

| | | | | |
|---|---|---|---|---|
| 6,166,734 | A * | 12/2000 | Nahi et al. | 715/748 |
| 6,298,373 | B1 * | 10/2001 | Burns et al. | 709/203 |
| 2002/0013852 | A1 * | 1/2002 | Janik | 709/231 |
| 2002/0042767 | A1 * | 4/2002 | Kwan | 705/36 |
| 2002/0068558 | A1 * | 6/2002 | Janik | 455/422 |
| 2003/0028884 | A1 * | 2/2003 | Swart et al. | 725/51 |
| 2003/0200321 | A1 * | 10/2003 | Chen et al. | 709/229 |
| 2006/0069730 | A1 * | 3/2006 | Azuma | 709/206 |
| 2008/0189360 | A1 * | 8/2008 | Kiley et al. | 709/203 |

* cited by examiner

*Primary Examiner* — Phuoc Nguyen
(74) *Attorney, Agent, or Firm* — Robert D. Marshall, Jr.; Wade James Brady, III; Frederick J. Telecky, Jr.

(57) ABSTRACT

In order to provide a home user with cost-effective PC processing capability, the home user is provided with a terminal which has only sufficient processing capability to communicate with a service provider over a network. Any processing and program execution is performed, in response to requests from the home user's terminal, by the service provider and the results are returned to the terminal. In addition to the processing capability, data is stored in the service provider. Because the processing and data storage is performed by the service provider, changes to the programs and/or hardware can the confined to the processing resources of the service provider. In addition, the service provider can be provided with virus and hacking protection, protection that will then not be necessary for the home user's terminal. In this manner, the home user can be charged for only the facilities and software that are actually used, while having available the full capability of a personal computer without the initial cost of a home computer, the on-going cost of maintenance, and the cost of upgrading hardware and software. The communication link can be a secure link.

8 Claims, 2 Drawing Sheets

APPARATUS AND METHOD FOR CONSUMER-ORIENTED DISTRIBUTION OF INFORMATION PROCESSING CAPABILITY

BACKGROUND OF THE INVENTION

1. Field of the Invention

This invention relates generally to the provision of data processing capability to the home user and, more particularly, to the economical and secure provision of this data processing capability to the consumer.

2. Background of the Invention

The advances in the versatility and power in the current personal computers has been enormous. The personal computer can handle an ever increasing list of programs and protocols. Even sophisticated image processing can now be performed on the higher end data processing products. Similarly, the price for the personal computer has continued to decrease despite the increases in performance.

However, the current personal computer, particularly as result of the versatility, frequently has capabilities beyond the needs and expertise of the home user. In addition, because of the frequent use of the personal computer to access the internet, the integrity of the personal computer is open to comprise from hackers and from viruses secluded in the incoming transmissions. Anti-virus programs are available but require installation, frequently not a trivial task.

In addition, a new program or updated program can be needed to perform a previously unneeded processing function. This program or update can require a significant cost to the user.

Summarizing, the current preferred method of providing data processing capability to the home user is the provision of the personal computer or PC. This unit, though currently cheap by historical standards, nonetheless can require a significant investment for the user. Moreover, a user frequently does not use the total capability provided by the processing unit and additional cost may be required to obtain different or upgraded/updated capabilities. In addition, the home user has to be concerned with the integrity of personal computer by providing frequently changing anti-virus and anti-penetration programs. In other words, the current procedure for providing processing capability may not be cost-effective from the point of view of the user. Finally, the user must purchase a system with sufficient data storage to support the anticipated data processing applications.

A need has therefore been felt for apparatus and an associated method having the feature of being able to provide a user with processing capability that is more cost-effective and less frustrating than the current system of providing the user with a stand-alone personal computer. It would be yet another feature of the apparatus and associated method to permit a user to pay only for processing activity actually used. It would still be a further feature of the apparatus and associated method to have access to upgraded/updated programs without the expense of purchasing the upgraded/updated program. It would be a further feature of the apparatus and associated method to provide users with the amount of data storage required for their processing needs. It would be a more particular feature of the apparatus and associated method to provide a user extended processing capability without requiring the purchase of a stand-alone personal computer. It would be a still more particular feature of the apparatus and associated method for a limited terminal to have control of the processing performed by a service provider. It would be yet another particular feature of the apparatus and associated method invention to permit a terminal remotely located from the service provider to control program selection, input data, determine the processing procedure being executed, and receive the results of the processing activity. It would be a still more particular feature of the apparatus and associated method to monitor the interaction of a user home terminal with the service provider. It would be yet another particular feature of the apparatus and associated method to charge a user only for the data processing services and data storage actually used.

SUMMARY OF THE INVENTION

The foregoing and other features are accomplished, according the present invention, by providing a home user with a terminal having a minimum of processing capability. The user home terminal is coupled to a service provider by a (secure) communication link. The processing capability of the terminal is needed only to process communications exchanged between the home terminal and the (secure) communication link and to process data exchanged between the terminal and devices, such a keyboards, display units, etc. Any processing to be performed for the user home terminal is performed by the service provider. Similarly, the data storage used to support the processing of the user home terminal is stored in the service provider.

Other features and advantages of present invention will be more clearly understood upon reading of the following description and the accompanying drawings and the claims.

DESCRIPTION OF THE PREFERRED EMBODIMENT

1. Detailed Description of the Figures

Figure 1:
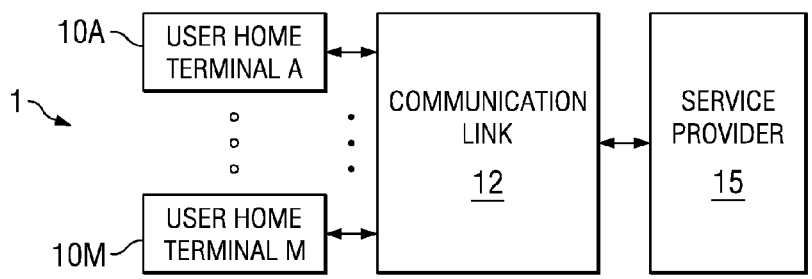
FIG. 1 is a block diagram for the system of responding to the home user processing requirements according to the present invention.

Referring now to FIG. 1, the general configuration of the processing facility 1, according to the present invention, is shown. A plurality of user home terminals 10A-10M exchange signals with a communication link 12. The communication link 12, in turn, exchanges signals with at least one service provider 15. While the configuration of FIG. 1 is similar to a multiplicity of processing systems/facilities, the present facility is distinguished by the division of processing responsibilities.

Figure 2:
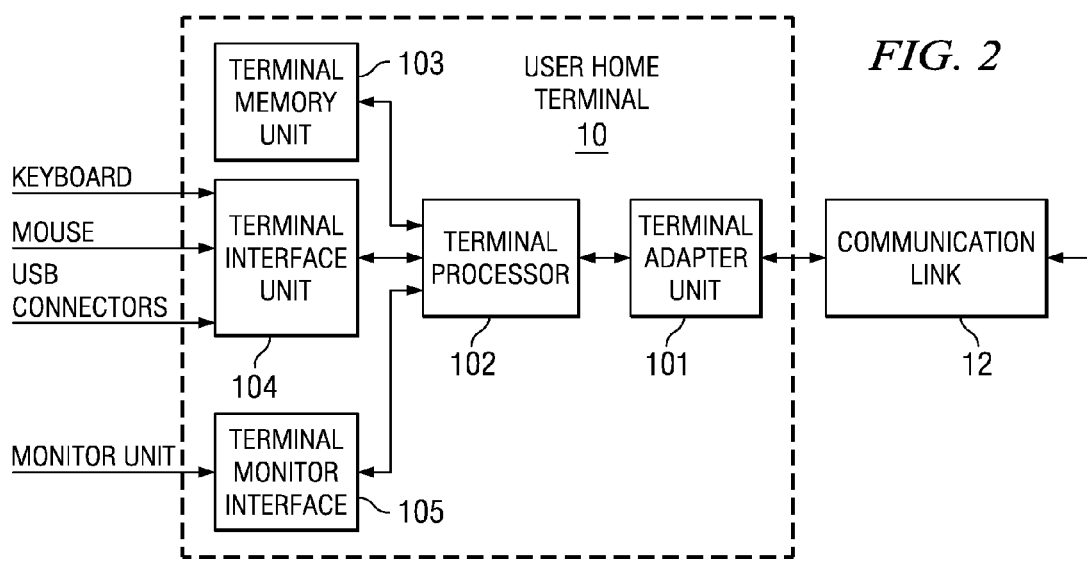
FIG. 2 is a block diagram of the user home terminal shown in FIG. 1 according to the present invention.

Referring to FIG. 2, the block diagram of the home user terminal(s) 10A-10M, according to the present invention, is shown. Signals from the communication link 12 are exchanged with the terminal adapter 101. The adapter 101 exchanges signals with the terminal processor 102. The terminal processor 102 exchanges signals with the terminal memory unit 103, the terminal interface unit 104, and terminal monitor interface unit 105. The terminal interface unit 104 can exchange signals with a keyboard, a mouse, a USB terminal, etc. The terminal monitor interface unit 105 exchanges signals with a monitor.

The terminal processor 102 has relatively limited processing capability. The terminal processor unit 102 controls and/or responds to the exchange of signals with the keyboard, the mouse, devices coupled to the USB connectors, etc. The terminal processor 102 provides for the compression/decompression and encryption of signals exchanged with communication link 12.

Figure 3:
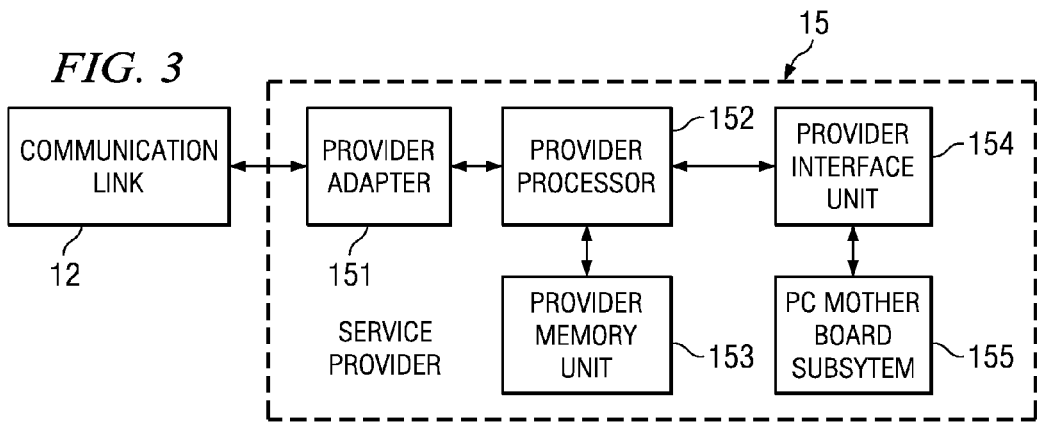
FIG. 3 is a block diagram of the service provider shown in FIG. 1 according to the present invention.

Referring now to FIG. 3, a block diagram of the service provider 15 is shown. The communication link 12 exchanges (secured) signals with the provider adapter 151. The provider adapter 151 exchanges signals with the provider processor 152. The provider processor 152 exchanges signals with the provider memory unit 153 and with the provider interface unit 154. The provider interface unit 154 exchanges signals with the PC motherboard subsystem 155.

The PC motherboard subsystem 155 provides processing capability requested by the user home terminal 10. The remaining apparatus of the service provider unit 15 processes the signals from the communication link 12 to supply the hardware and software resources to respond to the request for service from the user home terminal 10. By concentrating the actual processing function in the service provider 15, the processing capability of the user home terminal 10 can be minimized. Therefore, the processing capability of the user home terminal 10 is minimized permitting the terminal 10 to be relatively inexpensive to install and easy to maintain. Similarly, the data storage for the user is the provider memory unit 153 relieving the user home terminal 10 of additional complexity and expense. The provider processor 152 monitors the activity of the service provider 15 for each client terminal 10n. In this manner, the activity resulting from the request for processing of a home user terminal 10n can be identified and billing for services can be provided based on the activity generated by each home user.

Figure 4:
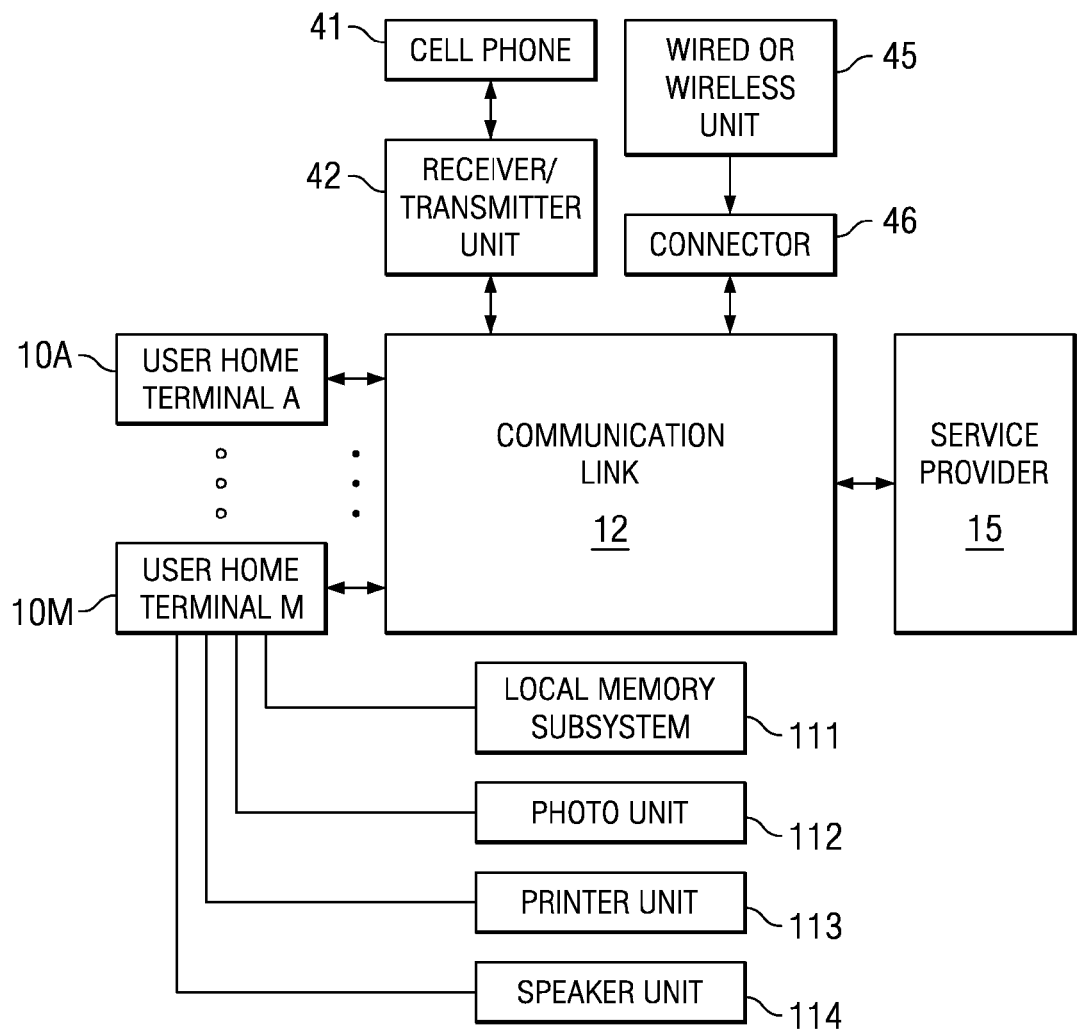
FIG. 4 is a block diagram illustrating additional components apparatus that can be added to the system shown in FIG. 1.

Referring to FIG. 4, some of the apparatus that can typically be added to facility 1 is shown. For example, the user home terminal 10n can have one or more of currently available local memory systems 111 coupled thereto. The user home terminal 10n can have a digital photo unit 112 and/or a printer unit 113 and/or speaker unit 114 coupled thereto. Similarly, the communication link 12 can have devices coupled thereto. For example, a cell phone 41 can be coupled to the communication link 12 through a receiver/transmitter unit 42. Similarly, a wired or wireless device 45 can be coupled to the communication link 12. Note that the devices can be coupled to the user home terminal 10n through the service provider unit 15. In this manner, the facilities of the service provider 15 can be used to expunge any virus or any other source of data processing corruption before transmission to the user home terminal 10n.

2. Operation of the Preferred Embodiment

The present invention provides apparatus and an associated method for providing a PC-level computer processing to a home-based user without requiring the user to have available a personal computer. Using this invention, a user of the processing facility does not have the expense of acquiring a personal computer, but can purchase or, more likely, rent an inexpensive terminal to interact with the service provider. Not only is the cost to the home user reduced, but continuing problems related to the possession of a personal computer are minimized. For example, the service provider is responsible for the integrity and non-accessibility of the stored data and integrity of the processing function. As will be clear, the superior resources of the served provider will be able to provide the necessary virus protection better than a relatively inexperienced PC home user. When upgrades to software programs are available, the utility rather than the user provides the upgrade. Any problems arising from the upgrade do not have to be addressed by the home user.

The data processing facility/utility of the present invention allows a home user to pay for only the processing services that are actually used. An invoice can be prepared based on such factors as the amount of processing time used by the home user, the software program used in the processing, and any other relevant information. Note that the user client does not pay for the processing capability that is not used or for the software packages that are available, but not used.

In the situation where the processing facility provides the terminal to the user/client, the problems of compatibility are resolved. As with software updates, the hardware updates can be provide provided as part of the service. The normal compatibility issues are therefore avoided or addressed by the processing facility.

As will be clear to those skilled in that art, architecture of the present processing facility lends itself to applications. For example, the facility would be particularly useful to the education environment. In this configuration, the (home user) terminal can be implemented by a PDA, the communication link can be implemented with a wireless LAN system and the service provider is a classroom computer. In this manner, each student can be provided with a comparatively simple terminal and get have access to the computational power of a stand-alone personal computer.

While the invention has been described with respect to the embodiments set forth above, the invention is not necessarily limited to these embodiments. Accordingly, other embodiments, variations, and improvements not described herein are not necessarily excluded from the scope of the invention, the scope of the invention being defined by the following claims.

What is claimed is:

1. A home computing resource system, the system comprising:
   a communication link;
   a user terminal, the user terminal including an adaptor, the adaptor exchanging signals with the communication link, the signals from the user terminal requesting data processing; and
   a service provider, the service provider exchanging signals with the communication link, wherein the service provider processes data in response to the user input of the user terminal and bills the user terminal corresponding to an amount of data processing performed in response to a request.

2. The system as recited in claim 1, wherein:
   data related to the user input is stored in the service provider; and
   the service provider further bills the user terminal corresponding to an amount of data stored in response to the user input of the user terminal.

3. A method for processing data for a user, the method comprising:
   providing home computing resources by a service provider;
   controlling the computing resources of the service provider by a user interacting with the service provider over a communication link; and
   billing a user corresponding to an amount of data processing performed in the service provider in response to a request.

4. The method as recited in claim 3, the method further comprising:
   storing data at the service provider in response to a user request; and
   billing the user corresponding to an amount of data stored at the service provider in response the user request.

5. A method for providing data processing capability to a home user, the method comprising:
   entering commands by a home user at a home user terminal;
   applying the commands to a communication link through an adaptor box in the user terminal;
   applying to commands on the communication link to a service provider;
   in the service provider; interpreting and executing the commands from the communication link; and
   billing the home user corresponding to an amount of data processing performed in the service provider in response to the commands.

6. The method as recited in claim 5, the method further comprising:
   storing data at the service provider in response to a command; and
   billing the user corresponding to an amount of data stored at the service provider in response the command.

7. A method for providing computer services to a user, the method comprising:
   with a user home terminal, providing commands identifying a processing activity;
   formatting the commands and applying the formatted commands to a communications link;
   applying the formatted commands transmitted on the communication link to a service provider;
   reformatting the formatting commands and executing the reformatted commands with a service provider;
   returning the results of the executed reformatted commands to the user terminal; and
   billing the user corresponding to an amount of data processing performed in the service provider in response to the commands.

8. The method as recited in claim 7, the method further comprising:
   storing data at the service provider in response to a command; and
   billing the user corresponding to an amount of data stored at the service provider in response the command.

\* \* \* \* \*